United States Patent [19]

Fischl

[11] Patent Number: 6,045,936
[45] Date of Patent: Apr. 4, 2000

[54] SAFETY COVER

[75] Inventor: Steven R. Fischl, Lawrenceville, Ga.

[73] Assignee: Motorola, Inc., Schaumburg, Ill.

[21] Appl. No.: 09/145,854

[22] Filed: Sep. 2, 1998

[51] Int. Cl.[7] .................................................. H01M 2/10
[52] U.S. Cl. .............................. 429/48; 429/96; 429/100
[58] Field of Search ................................ 429/96, 100, 99, 429/48

[56] References Cited

U.S. PATENT DOCUMENTS 5,917,306   6/1999   Fischl .

OTHER PUBLICATIONS

Picture of Safety Covers of StarTag and iDEN Eagle Batteries, and Respective Batteries (No Date).

*Primary Examiner*—John S. Maples
*Attorney, Agent, or Firm*—Felipe J. Farley; Philip H. Burrus, IV

[57] ABSTRACT

A safety cover for a battery comprises elastic pacts fixed to the safety cover that wipe the electrical contacts of the battery to which the safety cover is attached when the safety cover is placed on or removed from the battery

1 Claim, 4 Drawing Sheets

SAFETY COVER

TECHNICAL FIELD

This invention relates in general to rechargeable batteries and more articularly in the field of safety covers for rechargeable batteries.

BACKGROUND OF THE INVENTION

More than forty million Americans now use a cellular telephone and another seven million or so are expected to subscribe this year. In 1997, the wireless communication industry generated about 70 billion minutes of use, which was about two percent of the total telecommunication of use. By the year 2003, the wireless industry is expected to generate nearly ten percent of the minutes of use for the total telecommunications industry. With the growth in the use of cellular telephones, users have come to expect and demand constant increases in portability and reliability. A critical aspect of the reliability and portability of a cellular telephone is the reliability and portability of its power system, i.e., the battery. In order for the wireless communications industry to capture an even greater portion of the telecommunications market, consumers must be made to believe that batteries for their cellular telephone, and the spare battery carried on their persons will be ready for use, and not inadvertently discharged or placed in a condition where it cannot be used when desired.

Therefore there is a need for an improved battery safety cover.

DETAILED DESCRIPTION OF THE PREFERRED EMBODIMENT

The present invention is a safety cover for a battery which includes a pad for wiping the battery contacts. As the safety cover is placed on or removed from the battery, the pads contact and are compressed against the battery electrical contacts. This wiping action cleans off any layer of oxidation or contamination on the contacts, allowing the battery to make better electrical contacts with the host device.

Lack of good electrical contact between a battery and a host device is the greatest factor causing failure in cellular telephone communication. Typical use of a battery promotes build-up of non-conductive debris on battery contacts such as dirt, chemical films, and one or more layers of oxidized products. This conductive layer of debris can cause failure of a host device, often in the midst of a call, causing great dissatisfaction to the user. Though this debris on the battery's electrical contacts can be cleaned off, often a user will forget to do so, until a signal has already been interrupted. The present invention provides an almost automatic method of removing this slight layer of debris from the battery contacts. Everytime a battery is placed in the safety cover of the present invention, the contacts are wiped off with gentle pressure, which results in an electrical connection between the battery and the host device which is free from resistance increasing contamination.

Figure 1:
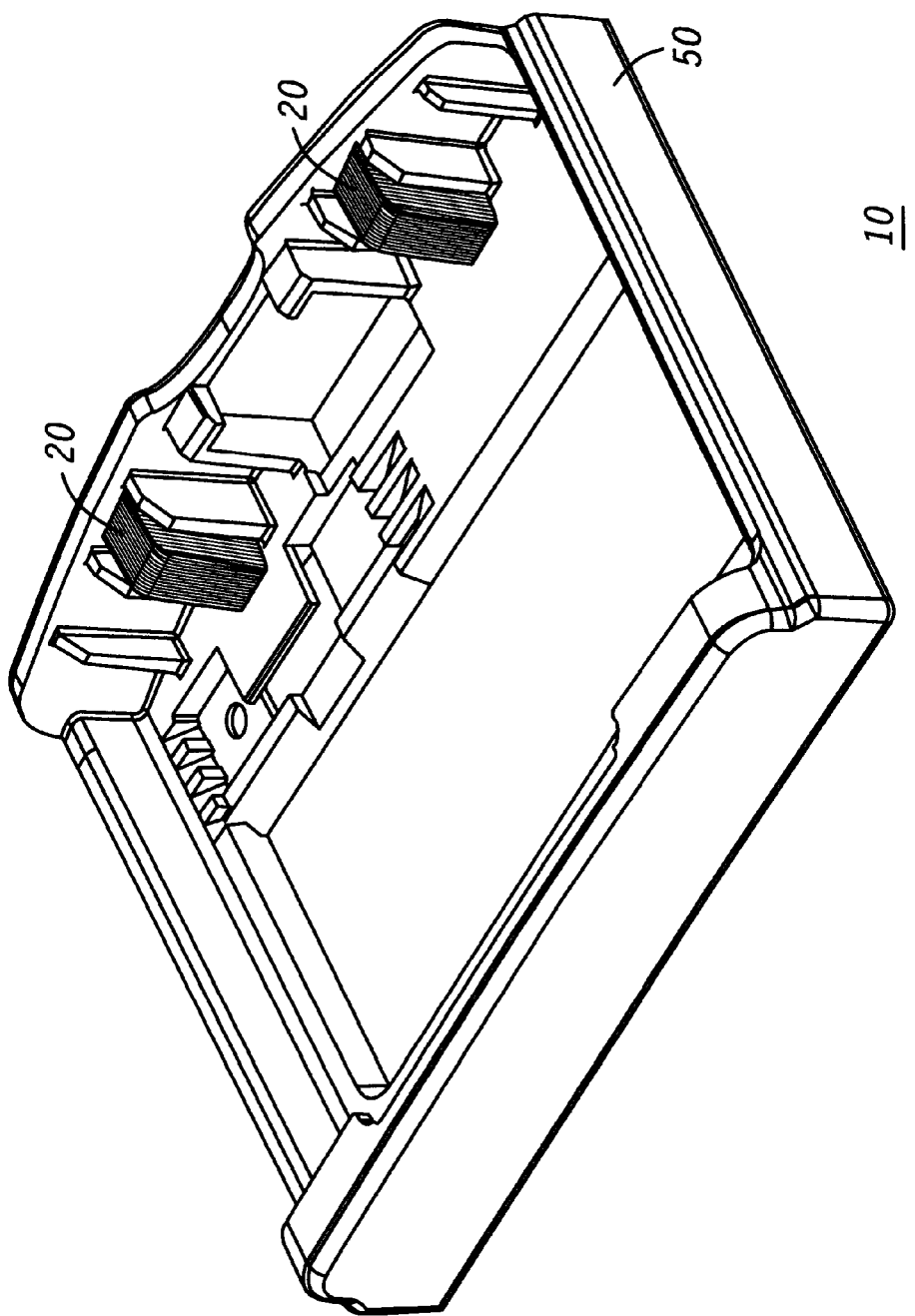
FIG. 1 is a perspective view of the safety cover of the present invention.
Figure 2:
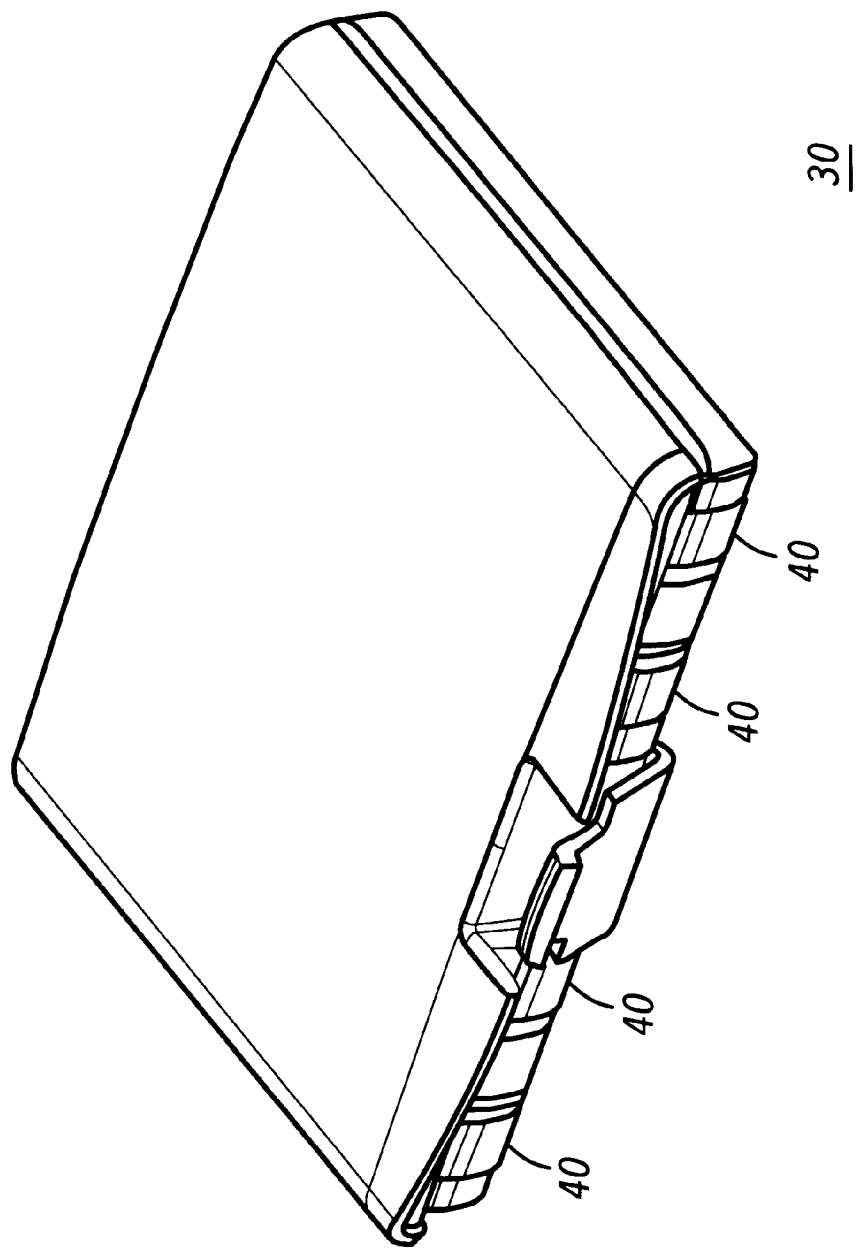
FIG. 2 is a perspective view of a cellular telephone battery.
Figure 3:
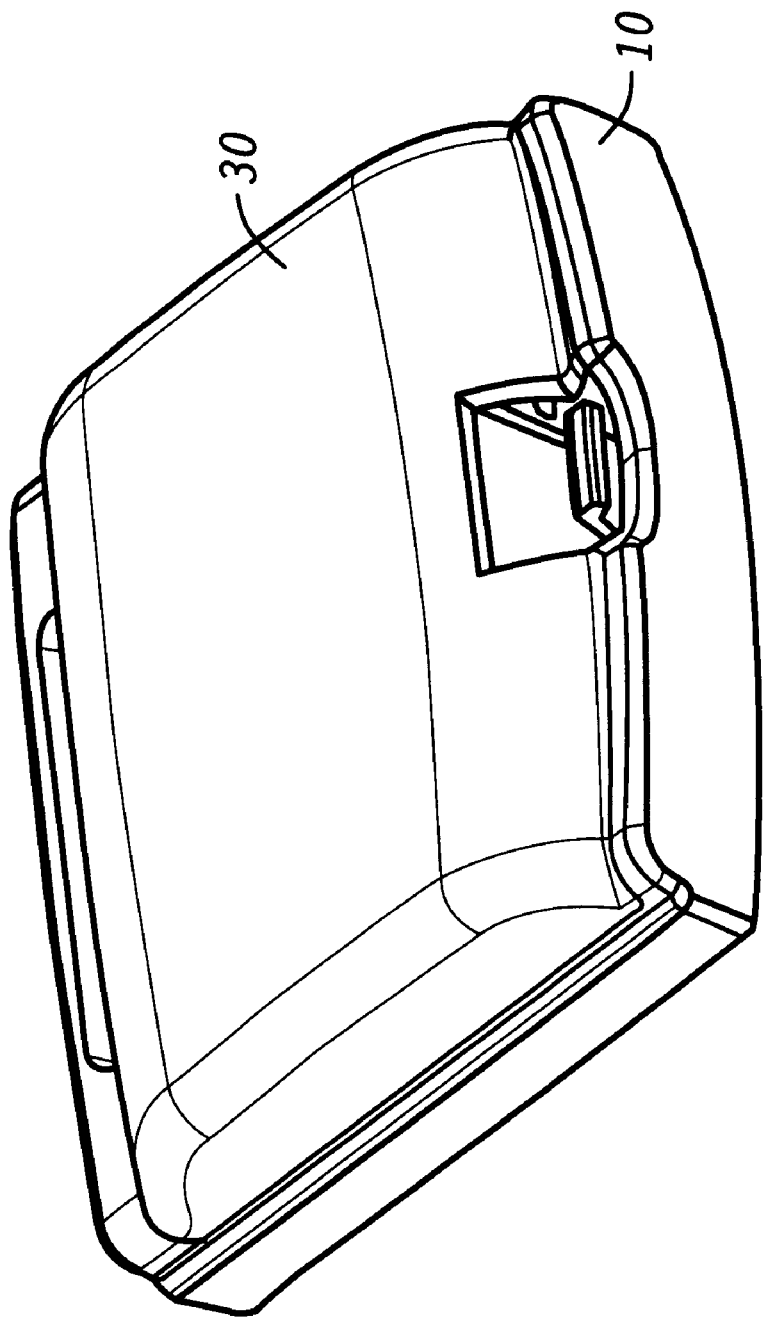
FIG. 3 is a perspective view of the safety cove.r of the present invention joined to a cellular telephone battery.
Figure 4:
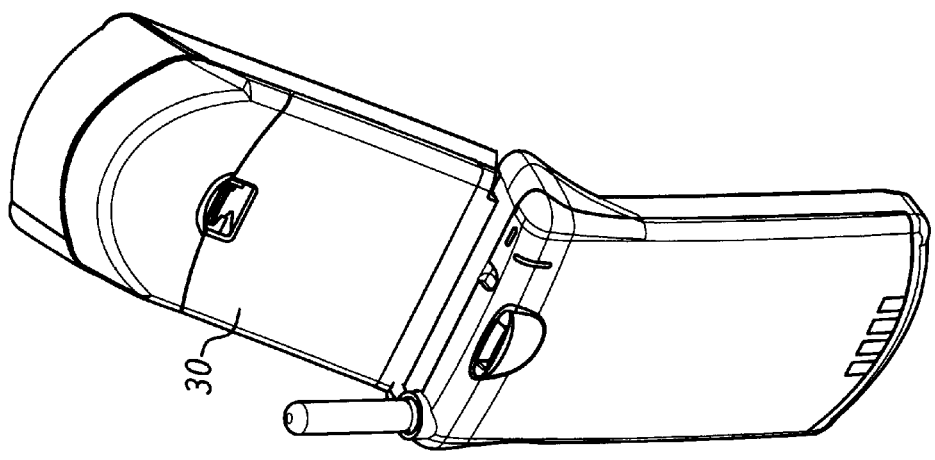

FIG. 1 is a perspective view of the battery safety cover of the present invention. The safety cover 10 comprises the frame (50) and pads (20). Pads (20), as shown in FIG. 2 and FIG. 3, are disposed to be coincident with one or more of battery contacts (40) on battery (30) when safety cover (10) is placed on battery (30). Pads (20) are made of a suitably elastic, suitable gentle material that will provide the slight pressure needed to clean the layer of debris from contacts (40) when safety cover (10) is placed on battery (30). Pad (20) may be comprised of such materials as, for example, synthetic suede with a pattern of bristles on the side contacting the battery contact, low density foam material such as polyester or polyurethane, nylon tricot, polymer resins such as nitrocellulose, cellulose acetobutylrate, polyvinyl chloride acetate copolymer, polyvinylidene fluoride, polyamides, urethane, epoxy resin, polyether resin, fluororesin, acrylonitrile, phenyl resin, felt, sponge, non-woven fabric, polyethylene terephthalate, polyethylene, naphthol, polypropylene, other poly olefins, cellulose acetate, cellulose diacetate, cellulose acetate propylate, polyvinyl chloride, and polyvinylidene fluoride, The pad maybe glued to the safety cover which may comprise the plastic material. The safety cover (10) may make what is known as a "snap-fit" with the battery, the only requirement being that the safety cover (10) when joined to the battery, forced the pads onto the contacts (40).

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A safety cover for a battery for a host device, said battery having electrical contacts, wherein the safety cover comprises:

elastic pads fixed to the safety cover that wipe the electrical contacts of the battery to which the safety cover is attached when the safety cover is placed on or removed from the battery permitting the battery to make better electical contact with the host device after the safety cover is removed from the battery.

* * * * *

UNITED STATES PATENT AND TRADEMARK OFFICE
CERTIFICATE OF CORRECTION

PATENT NO : 6,045,936
DATED : April 4, 2000
INVENTOR(S) : Fischl, Steven

It is certified that error appears in the above-identified patent and that said Letters Patent is hereby corrected as shown below:

On the title page,
In the Abstract line reads, "pacts" should be --pads--.

Signed and Sealed this

Thirteenth Day of February, 2001

*Attest:*

NICHOLAS P. GODICI

*Attesting Officer*     *Acting Director of the United States Patent and Trademark Office*